May 1, 1951 A. BECKELMAN 2,550,902
COFFEE-STEEPING DEVICE
Filed Feb. 27, 1947
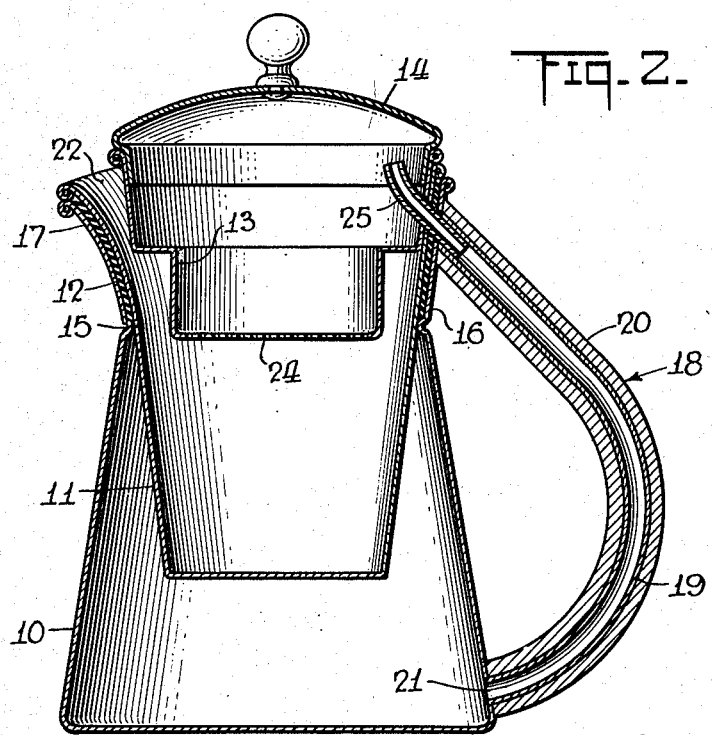
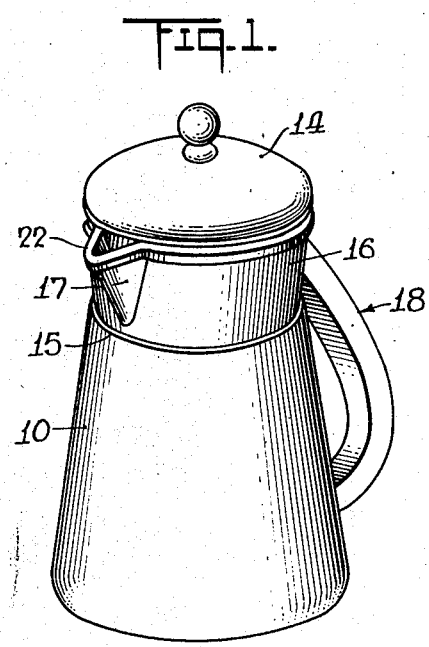
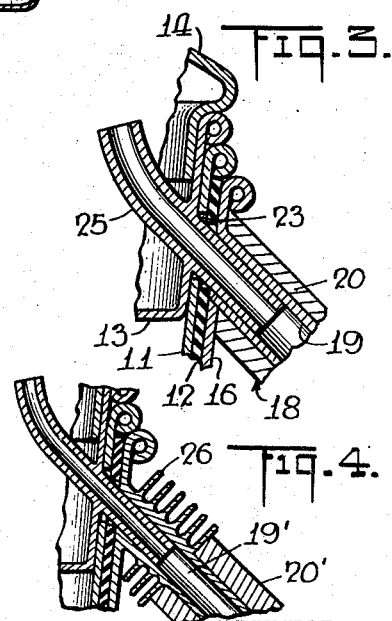
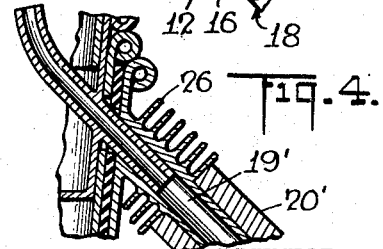
INVENTOR
*Abraham Beckelman*
BY
*Frederick Breitenfeld*
ATTORNEY Patented May 1, 1951

2,550,902

UNITED STATES PATENT OFFICE 2,550,902

COFFEE-STEEPING DEVICE

Abraham Beckelman, New York, N. Y.

Application February 27, 1947, Serial No. 731,215

11 Claims. (Cl. 99—316)

My present invention relates generally to the art of making infusions, and has particular reference to an improved apparatus for steeping coffee, tea, and the like.

While I have herein illustrated and shall hereinafter describe my invention as it may be applied to the art of making coffee, it is to be understood that certain phases of my invention have a wider applicability. Accordingly, the term "coffee" is intended to include within its significance such materials as tea and the like; and the term "water" is similarly intended to include within its significance any liquid in which the material is to be steeped.

It is a general object of my invention to provide an improved household device of the general type which automatically causes a predetermined mass of heated water to pass once through a measured quantity of ground coffee or the like in order to produce a brew of desired strength.

A more particular object of the invention is to provide a structure composed of separate elements which are readily capable of assembly and separation without requiring any special skill and without any likelihood of faulty assembly or functioning.

Another object is to provide a construction in which the several parts are of relatively simple shape, inexpensive to manufacture, staunch and rugged in structural character, and easily cleaned.

Another object is to provide a device which is unusually safe in operation and which functions with no likelihood of injury to the parts, or impairment of the desired brew, in the event that the applied heat is inadvertently continued beyond the necessary time.

It is a particular feature of my invention to provide a structure having the simple and attractive appearance of an ordinary coffee-pot with a handle and a pouring spout, and which can be removed from the stove and immediately utilized to pour the brewed coffee. The structure is characterized by the provision of a hollow handle which establishes a concealed communication between the lower and upper parts of an outer water-containing vessel, the upper part of the vessel being provided with a perforated receptacle in which the coffee to be steeped is accommodated.

I achieve the foregoing general objectives and advantages, and such other objects and advantages as may hereinafter appear or be pointed out, in the manner illustratively exemplified in the accompanying drawings in which:

Figure 1 is a perspective view of a coffee-steeping device of the present improved character;

Figure 2 is an elevational cross-sectional view of the parts in assembled relationship;

Figure 3 is an enlarged fragmentary cross-sectional view of the association of elements in the upper right-hand portion of Figure 2; and Figure 4 is a view similar to Figure 3 illustrating a modification.

The elements of the present device consist of the outer vessel 10, the pot 11, the gasket or washer 12, the perforated receptacle 13, and the cover 14. All of these elements are substantially circular in horizontal cross-section.

The outer vessel 10 may have any desired shape and is preferably somewhat larger at the bottom, the walls converging upwardly to an internal rib or shoulder 15, then diverging to form an upper neck 16. In one region, the neck is shaped to define the conventional spout-like projection 17. This vessel is provided with a handle 18 which extends from a point near the bottom of the vessel 10 to the upper part of the neck 16. In accordance with my invention, this handle is hollow, and comprises an inner tube 19 and a covering 20. The hollow handle defines a conduit which communicates at 21 with the lower part of the vessel 10, its upper outlet end being similarly open. The tube 19 is of heat-conductive material, and the covering 20 is of non-heat-conductive material, such as wood or the like. The vessel 10 may be composed of any conventional material such as aluminum or the like.

The pot 11 is similarly of aluminum or the like, and has a spout portion 22 adapted to nest within the spout portion 17 of the vessel 10. The spout 22 is the actual pouring spout of the device.

The pot 11 is removably insertable into the vessel 10, and the gasket or washer 12 serves to keep the pot 11 and the neck 16 in steam-sealing relation. The gasket 12 may be of any convenient material or shape, preferably rubber or its equivalent. The rib or shoulder 15 serves as a convenient means for supporting this washer in proper position.

The pot 11 is provided with an opening 23 which registers with the upper outlet of the hollow handle when the parts are properly assembled.

Preferably, the spout of the structure is diametrically opposite the handle, to conform to conventional design, but this is obviously not essential. Also, the pot 11 and the vessel 10 may be provided at their upper edges with a bead or rim of the character illustrated, to rigidify the parts. This is conventional but not absolutely essential.

The receptacle 13 is provided with a bottom wall 24 which is perforated. This receptacle is substantially circular, having no spout portion, and it fits removably in the upper part of the pot 11. It may be provided with a beaded edge to help support it, but if the parts are slightly tapered, as shown, this in itself will serve to hold them in proper relationship. The receptacle 13 is adapted to receive a measured charge of ground coffee or the like.

Carried by the receptacle 13 and projecting through a wall thereof is a pipe 25. The outer part of this pipe is of such size and disposition that it may be readily fitted through the opening 23 into the upper outlet end of the hollow handle, as shown most clearly in Figure 3. The inner part of the pipe 25 is directed upwardly toward the cover 14 which may be of conventional character adapted to rest upon the rim of the receptacle 13.

When the apparatus is to be used, a measured quantity of water is placed in the outer vessel 10. This amount will be such that the quantity lying above the opening 21 will be just sufficient to prepare a desired quantity of brew. The gasket or washer 12 is then placed into position, and the pot 11 is inserted. If the spout 22 is nested with the spout portion 17, the pot opening 23 will be in proper alignment with the upper outlet of the hollow handle. The receptacle 13 is then inserted, with the outer part of the pipe 25 extending into the hollow handle, as shown in the drawings. A measured quantity of the coffee is then introduced into the receptacle 13, this quantity being a predetermined amount corresponding to the amount of water available for forming the desired brew. Then, after application of the cover 14, the apparatus is placed on the stove or burner. The heat absorbed by the water will form steam above it, and the steam pressure will push the water upwardly through the hollow handle and out of the pipe 25, whereupon the water will strike the underside of the cover 14 and fall downwardly onto the coffee in the receptacle 13. The water will seep through the coffee, steeping the coffee as it does so, and the resultant brew will fall into the pot 11. It is poured in the usual way by grasping the handle and tipping the device so that the coffee flows from the spout 22.

Obviously, when the water level falls to the opening 21, no further water is forced up the hollow handle, and this is an indication that the brewing procedure has been completed. Thereafter, if the application of heat is continued, the steam that is formed has a ready escape through the hollow handle, the perforated receptacle 13, and the spout 22.

The provision of the passageway for the water and steam through the handle itself minimizes any danger of completely boiling all the water from the vessel 10, because the handle is well exposed to the atmosphere and any steam which passes through it will have a tendency to condense and return to the vessel 10. To enhance this effect, the apparatus may be modified as indicated in Figure 4. In this modified construction, the covering 20' of the inner tube 19' terminates short of the upper end of the conduit, thereby leaving the upper portion of the tube 19' completely exposed. The heat dissipated from this exposed portion of the conduit may be increased by providing metal fins 26 on the exposed conduit portion.

In other respects, the construction of Figure 4 is the same as that hereinbefore described.

In Figure 1 I have shown the handle 18 with an exterior configuration substantially square or rectangular in cross section. This is not essential, as will be understood, although the square shape affords a better hand-grip.

Nor is it essential to the contemplated functioning of the device that the washer 12 be of the particular character shown, or that it be supported by a shoulder 15 of the type illustrated. Under certain circumstances, this washer or an equivalent thereof may be permanently or removably associated in other ways with either the neck portion of the outer vessel or the upper part of the pot 11.

In general, it will be understood that the details herein described and illustrated are merely illustrative, and that those skilled in the art may readily make changes therein without necessarily departing from the spirit and scope of the invention as expressed in the appended claims.

Having thus described my invention and illustrated its use, what I claim as new and desire to secure by Letters Patent is:

1. In a coffee-steeping device, an outer vessel having an upper neck and adapted to contain water, a pot removably supported in said neck, means retaining said pot and neck in steam-sealing relation, a perforated receptacle removably supported in said pot and adapted to hold the coffee to be steeped, a hollow handle on the outer vessel establishing communication between the lower part of said vessel and said neck, said pot having an opening in registry with the upper outlet of said handle, and a pipe carried by and projecting through the wall of said receptacle, the outer part of said pipe extending through said pot opening and through the wall of said outer vessel into said upper outlet.

2. In a coffee-steeping device, an outer vessel having an upper neck and adapted to contain water, a pot removably supported in said neck, means retaining said pot and neck in steam-sealing relation, a perforated receptable removably supported in said pot and adapted to hold the coffee to be steeped, a removable cover fitted over said receptacle, a hollow handle on the outer vessel establishing communication between the lower part of said vessel and said neck, said pot having an opening in registry with the upper outlet of said handle, and a pipe carried by and projecting through the wall of said receptacle, the inner part of said pipe being directed upwardly toward said cover, the outer part of said pipe extending through said pot opening and through the wall of said outer vessel into said upper outlet.

3. In a coffee-steeping device, an outer vessel having an upper neck and adapted to contain water, a pot removably supported in said neck, means retaining said pot and neck in steam-sealing relation, a perforated receptacle removably supported in said pot and adapted to hold the coffee to be steeped, a hollow handle on the outer vessel having its upper and lower ends secured to said vessel and defining a concealed conduit establishing communication between the lower part of said vessel and said neck, and a pipe extending from the upper outlet of said handle through the wall of said outer vessel and into said receptacle, said handle comprising an inner tube of heat-conductive material and a covering for said tube of non-heat-conductive material, said covering leaving the upper part of said tube exposed.

4. In a coffee-steeping device, an outer vessel having an upper neck and adapted to contain water, a pot removably supported in said neck, means retaining said pot and neck in steam-sealing relation, a perforated receptacle removably supported in said pot and adapted to hold the coffee to be steeped, a hollow handle on the outer vessel having its upper and lower ends secured to said vessel and defining a concealed conduit establishing communication between the lower part of said vessel and said neck, and a pipe extending from the upper outlet of said handle through the wall of said outer vessel and into said receptacle, said handle comprising an inner tube of heat-conductive material and a covering for said tube of non-heat-conductive material, said covering leaving the upper part of said tube exposed, and said exposed tube part being provided with heat-dissipating fins.

5. In a coffee-steeping device, an outer vessel having an upper neck and adapted to contain water, a pot removably supported in said neck, means retaining said pot and neck in steam-sealing relation, a perforated receptacle removably supported in said pot and adapted to hold the coffee to be steeped, a hollow handle on said outer vessel having its upper and lower ends secured to said vessel and defining a concealed conduit between the lower and upper parts of said vessel, and a pipe extending through said perforated receptacle and having an outer end slidably fitting through the wall of said outer vessel and snugly into the upper end of said conduit, said pipe defining a continuation of said conduit so that water passing upwardly through said conduit will be guided through said pipe into said perforated receptacle.

6. In a coffee-steeping device, an outer vessel having an upper neck and adapted to contain a liquid, said outer vessel having an opening extending through its wall adjacent the top thereof, a pot removably supported in said neck, said pot having an opening extending through its wall adjacent the top thereof and in position to register with the opening in the outer vessel, a hollow handle secured to said outer vessel, a conduit provided in said handle, said conduit being in open communication with the lower part of said outer vessel and with the opening extending through the wall of the outer vessel adjacent its top, a perforated receptacle removably supported in said pot, and a pipe extending through a side wall of said perforated receptacle with an end outside of said side wall removably extending through the openings in the pot and the outer vessel and to the upper end of said conduit.

7. In a coffee-steeping device, an outer vessel having an upper neck and adapted to contain a liquid, said outer vessel having an opening extending through its wall adjacent the top thereof, a pot removably supported in said neck, said pot having an opening extending through its wall adjacent the top thereof and in position to register with the opening in the outer vessel, means retaining the pot and neck in pressure sealing relation, a hollow handle secured to said outer vessel, a conduit provided in said handle, said conduit being in open communication with the lower part of said outer vessel and with the opening extending through the wall of the outer vessel adjacent its top, a perforated receptacle removably supported in said pot, and a pipe extending through a side wall of said perforated receptacle with an end thereof extending outside of said side wall and removably extending through the openings in the pot and the outer vessel and slidably into the upper portion of said conduit.

8. In a coffee-steeping device, an outer vessel having an upper neck and adapted to contain a liquid, said outer vessel having an opening extending through its wall adjacent the top thereof, a pouring spout formed on the upper neck of said outer vessel, a pot removably supported in said neck, said pot having an opening extending through its wall adjacent the top thereof and in position to register with the opening in the outer vessel, a pouring spout formed on the upper portion of said pot, said spout conforming substantially in shape to the spout in the outer vessel and being adapted to fit therein, a hollow handle secured to said outer vessel, a conduit provided in said handle, the lower end of said conduit being in open communication with the lower part of said outer vessel and with the upper end thereof in open communication with the opening extending through the wall of the outer vessel adjacent its top, a perforated receptacle removably supported in said pot, and a pipe extending through a side wall of said perforated receptacle with an end thereof extending outside of said side wall and removably extending through the openings in the pot and the outer vessel and slidably into a portion of the upper end of said conduit, the spouts on the outer vessel and the pot being located in relation to the openings in the outer vessel and pot so that said openings are in alignment whenever the spout of the pot is fitted into the spout of the outer vessel.

9. In a coffee-steeping device, an outer vessel having an upper neck and adapted to contain a liquid, said outer vessel having an opening extending through its wall adjacent the top thereof, a pouring spout formed on the upper neck of said outer vessel, a pot removably supported in said neck, said pot having an opening extending through its wall adjacent the top thereof and in position to register with the opening in the outer vessel, a pouring spout formed on the upper portion of said pot, said spout conforming substantially in shape to the spout in the outer vessel and being adapted to fit therein, means retaining the pot and neck in pressure sealing relation, a hollow handle secured to said outer vessel, a conduit provided in said handle, said conduit being in open communication with the lower part of said outer vessel and with the opening extending through the wall of the outer vessel adjacent its top, a perforated receptacle removably supported in said pot, and a pipe extending through a side wall of said perforated receptacle with an end thereof extending outside of said side wall and removably extending through the openings in the pot and outer vessel and slidably into a portion of the upper end of said conduit.

10. In a coffee-steeping device, an outer vessel having an upper neck and adapted to contain a liquid, said outer vessel having an opening extending through its wall adjacent the top thereof, a pot removably supported in said neck, said pot having an opening extending through its wall adjacent the top thereof and in position to register with the opening in the outer vessel, a hollow handle secured to said outer vessel, a conduit provided in said handle, said conduit being in open communication with the lower part of said outer vessel and with the opening extending through the wall of the outer vessel adjacent its top, a perforated receptacle removably supported in said pot, a pipe extending through a side wall of said perforated receptacle with an end thereof extending outside of said side wall and removably extending through the openings in the pot and the outer vessel and slidably into the upper portion of said conduit, and heat-dissipating fins on said handle adjacent the upper end thereof.

11. In a coffee-steeping device, an outer vessel having an upper neck and adapted to contain a liquid, said outer vessel having an opening extending through its wall adjacent the top thereof, a pot removably supported in said neck, said pot having an opening extending through its wall adjacent the top thereof and in position to register with the opening in the outer vessel, a hollow handle secured to said outer vessel, a conduit provided in said handle, said conduit being in open communication with the lower part of said outer vessel and with the opening extending through the wall of the outer vessel adjacent its top, a perforated receptacle removably supported in said pot, a lid for said perforated receptacle, and a pipe extending through a side wall of said perforated receptacle with an end thereof extending outside of said side wall and removably extending through the openings in the pot and the outer vessel and slidably into the upper portion of said conduit, said pipe extending inside of the perforated vessel being inclined upwardly so that liquid emerging therefrom will deflect against said lid and be distributed evenly downwardly into said perforated vessel.

ABRAHAM BECKELMAN.

REFERENCES CITED

The following references are of record in the file of this patent:

UNITED STATES PATENTS

| Number | Name | Date |
|---|---|---|
| Re. 17,077 | Pouget | Sept. 4, 1928 |
| 826,798 | Peterman | July 24, 1906 |
| 1,158,421 | Abtmeyer | Nov. 2, 1915 |
| 1,549,091 | Kelly | Aug. 11, 1925 |
| 1,655,014 | Herring | Jan. 3, 1928 |
| 1,753,783 | Guerin et al. | Apr. 8, 1930 |
| 1,882,140 | Haines | Oct. 11, 1932 |
| 1,978,561 | Battilani | Oct. 30, 1934 |
| 2,046,710 | Umstott | July 7, 1936 |
| 2,342,692 | Rehm | Feb. 29, 1944 |